(12) United States Patent
Roberts et al.

(10) Patent No.: US 12,098,980 B2
(45) Date of Patent: *Sep. 24, 2024

(54) SYSTEMS AND METHODS OF ALARM TRIGGERED EQUIPMENT VERIFICATION USING DRONE DEPLOYMENT OF SENSORS

(71) Applicant: Tyco Fire & Security GmbH, Neuhausen am Rheinfall (CH)

(72) Inventors: Matthew Roberts, North Chelmsford, MA (US); Stephen Tarmey, Leominster, MA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,697

(22) Filed: Jul. 13, 2023

(65) Prior Publication Data
US 2023/0358642 A1     Nov. 9, 2023

Related U.S. Application Data

(63) Continuation of application No. 17/880,978, filed on Aug. 4, 2022, now Pat. No. 11,740,160, which is a
(Continued)

(51) Int. Cl.
*G01M 99/00* (2011.01)
*B64U 10/00* (2023.01)
(Continued)

(52) U.S. Cl.
CPC ......... *G01M 99/005* (2013.01); *G05D 1/0011* (2013.01); *G05D 1/0094* (2013.01);
(Continued)

(58) Field of Classification Search
CPC .... G08B 13/196; G08B 21/185; G08B 21/18; G08B 17/00; G01M 99/005;
(Continued)

(56) References Cited

U.S. PATENT DOCUMENTS

10,462,366 B1   10/2019   Bart et al.
10,726,712 B2    7/2020   Locke et al.
(Continued)

*Primary Examiner* — An H Do
(74) *Attorney, Agent, or Firm* — Foley & Lardner LLP (57) ABSTRACT

An equipment monitoring system includes an unmanned vehicle, an alarm circuit remote from the unmanned vehicle, and a vehicle control circuit remote from the unmanned vehicle. The unmanned vehicle can include a communications circuit and a flight controller. The alarm circuit detects a failure condition of a building component and outputs an indication of the failure condition. The vehicle control circuit receives the indication of the failure condition from the alarm circuit; generates, based on the indication of the failure condition, an equipment verification signal that includes an identifier of the building component, a position of the building component, and a test of the building component to be executed; and transmits the equipment verification signal to the flight controller of the unmanned vehicle via the communications circuit of the unmanned vehicle to cause the unmanned vehicle to execute the test of the building component.

20 Claims, 6 Drawing Sheets

Related U.S. Application Data continuation of application No. 16/117,030, filed on Aug. 30, 2018, now Pat. No. 11,415,486.

(51) Int. Cl.
| | |
|---|---|
| *B64U 101/30* | (2023.01) |
| *B64U 101/75* | (2023.01) |
| *G05D 1/00* | (2024.01) |
| *G08B 21/18* | (2006.01) |

(52) U.S. Cl.
CPC ............ G08B 21/185 (2013.01); *B64U 10/00* (2023.01); *B64U 2101/30* (2023.01); *B64U 2101/75* (2023.01); *B64U 2201/20* (2023.01)

(58) Field of Classification Search
CPC ................ G05D 1/0011; G05D 1/0094; B64C 2201/126; B64C 2201/12; B64C 2201/123; B64C 2201/146; B64C 39/024
See application file for complete search history.

(56) References Cited

U.S. PATENT DOCUMENTS

| | | | |
|---|---|---|---|
| 10,832,562 | B2 | 11/2020 | Jegodtka |
| 11,186,365 | B2 | 11/2021 | Illuminati et al. |
| 11,415,486 | B2 | 8/2022 | Roberts et al. |
| 11,740,160 | B2 * | 8/2023 | Roberts .................. G08B 21/18 |
| | | | 702/108 |

* cited by examiner

SYSTEMS AND METHODS OF ALARM TRIGGERED EQUIPMENT VERIFICATION USING DRONE DEPLOYMENT OF SENSORS

CROSS-REFERENCE TO RELATED APPLICATIONS

The present application is a continuation of U.S. patent application Ser. No. 17/880,978, filed Aug. 4, 2022, which is a continuation of U.S. patent application Ser. No. 16/117,030, filed Aug. 30, 2018, the disclosure of each of which is incorporated herein by reference in its entirety.

BACKGROUND

Commercial buildings typically using large building control systems such as fire detection systems, heating, ventilation, and air conditioning (HVAC) systems, access control systems, and video surveillance systems.

SUMMARY

One implementation of the present disclosure is an equipment monitoring system. The equipment monitoring system includes an unmanned vehicle, an alarm circuit remote from the unmanned vehicle, and a vehicle control circuit remote from the unmanned vehicle. The unmanned vehicle including a communications circuit and a flight controller. The alarm circuit detects a failure condition of a building component and outputs an indication of the failure condition. The vehicle control circuit receives the indication of the failure condition from the alarm circuit; generates, based on the indication of the failure condition, an equipment verification signal that includes an identifier of the building component, a position of the building component, and a test of the building component to be executed; and transmits the equipment verification signal to the flight controller of the unmanned vehicle via the communications circuit of the unmanned vehicle to cause the unmanned vehicle to execute the test of the building component.

Another implementation of the present disclosure is a method of alarm triggered equipment verification using drone deployment of sensors. The method includes detecting, by an alarm circuit remote from an unmanned vehicle, a failure condition of a building component; outputting, by the alarm circuit to a vehicle control circuit remote from the unmanned vehicle, an indication of the failure condition; generating, by the vehicle control circuit based on the indication of the alarm condition, an equipment verification signal that includes an identifier of the building component, a position of the building component, and a test of the building component to be executed; and transmitting, by the vehicle control circuit to a flight controller of the unmanned vehicle via a communications circuit of the unmanned vehicle, the equipment verification signal to cause the unmanned vehicle to execute the test of the building component.

Another implementation of the present disclosure is a vehicle control circuit including one or more processors and a non-transitory processor-executable medium storing processor-readable instructions. The instructions, when executed by the one or more processors, cause the one or more processors to receive, from an alarm circuit remote from an unmanned vehicle, an indication of an alarm condition regarding a building component; generate, based on the indication of the alarm condition, an equipment verification signal that includes an identifier of the building component; and output, to a flight controller of the unmanned vehicle via a communications circuit of the unmanned vehicle, the equipment verification signal to cause the unmanned vehicle to execute a test of the building component.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

The present disclosure relates generally to the field of HVAC systems, and more particularly to systems and methods of alarm triggered equipment verification using drone deployment of sensors. Referring generally to the Figures, an equipment monitoring system includes an unmanned vehicle, an alarm circuit remote from the unmanned vehicle, and a vehicle control circuit remote from the unmanned vehicle. The unmanned vehicle including a communications circuit and a flight controller. The alarm circuit detects a failure condition of a building component and outputs an indication of the failure condition. The vehicle control circuit receives the indication of the failure condition from the alarm circuit; generates, based on the indication of the failure condition, an equipment verification signal that includes an identifier of the building component, a position of the building component, and a test of the building component to be executed; and transmits the equipment verification signal to the flight controller of the unmanned vehicle via the communications circuit of the unmanned vehicle to cause the unmanned vehicle to execute the test of the building component. For example, the unmanned vehicle can travel to within a proximity of the building component, and use a sensor to execute the test of the building component to receive sensor data that can be used to evaluate the test of the building component, and thus to verify if the building component is in the failure condition (such that it is appropriate for the alarm circuit to indicate that the building component is in an alarm state) or to determine that the failure condition is not present and an alarm should be discontinued.

The present solution can improve upon existing equipment verification systems by enabling more rapid and accurate alarm condition verification, including in conditions where existing verification methods may be limited due to environmental factors such as location, heat, and presence of gases.

Building Management System and HVAC System

Figure 1:
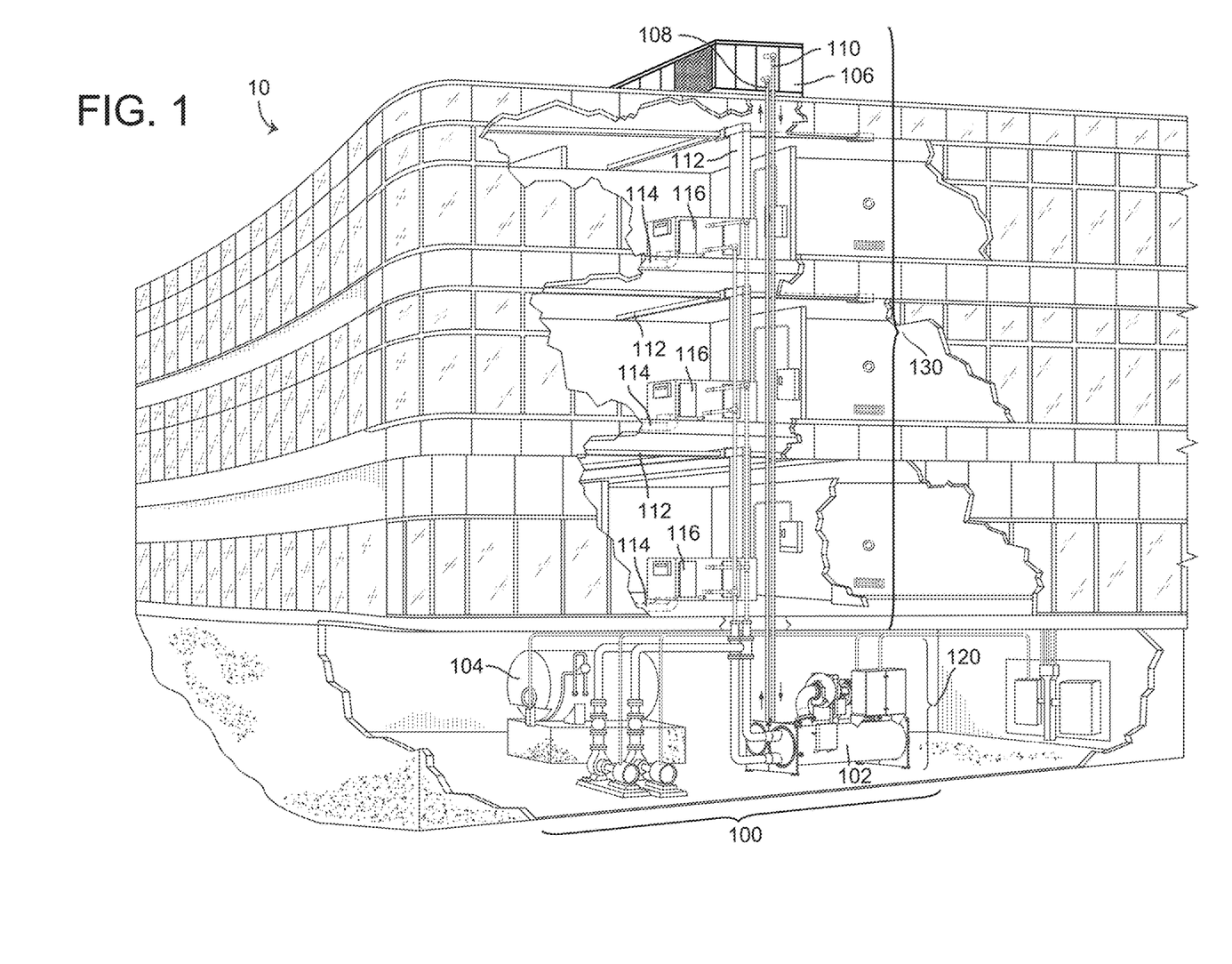
FIG. 1 is a drawing of a building equipped with a HVAC system, according to an exemplary embodiment.

Referring now to FIGS. 1-4, an exemplary building management system (BMS) and HVAC system in which the systems and methods of the present disclosure can be implemented is depicted. Referring particularly to FIG. 1, a perspective view of a building 10 is shown. Building 10 is served by a BMS. A BMS is, in general, a system of devices that can control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) that provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers that pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In some embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) that measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
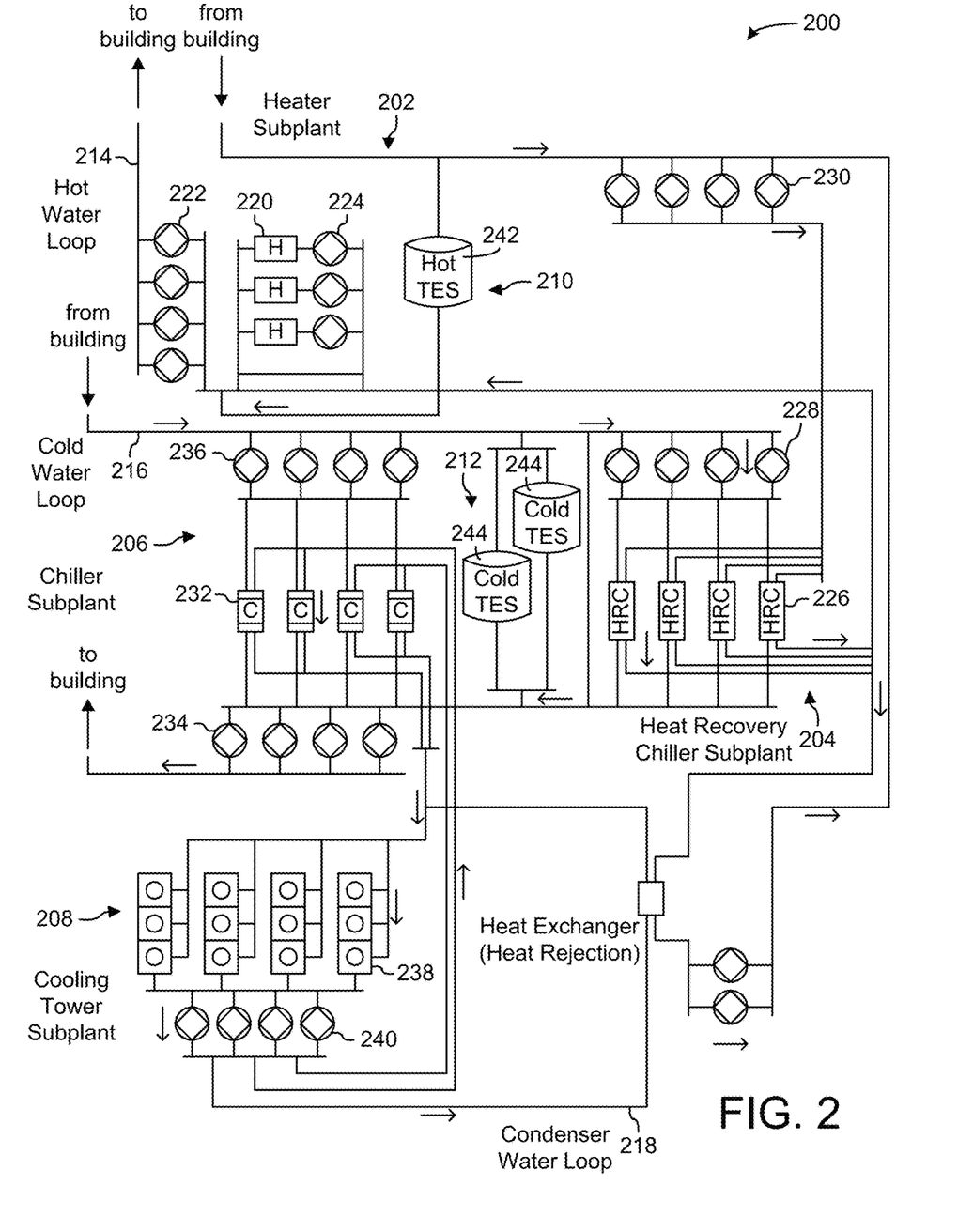
FIG. 2 is a schematic diagram of a waterside system which may be used in conjunction with the building of FIG. 1, according to an exemplary embodiment.

Referring now to FIG. 2, a block diagram of a waterside system 200 is depicted. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is depicted as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can heat water in a hot water loop 214 that circulates the hot water between heater subplant 202 and building 10. Chiller subplant 206 can chill water in a cold water loop 216 that circulates the cold water between chiller subplant 206 building 10. Heat recovery chiller subplant 204 can transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In some embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment that can facilitate the functions of the subplant. For example, heater subplant 202 is shown to include a plurality of heating elements 220 (e.g., boilers, electric heaters, etc.) that add heat to the hot water in hot water loop 214. Heater subplant 202 is also shown to include several pumps 222 and 224 that circulate the hot water in hot water loop 214 and to control the flow rate of the hot water through individual heating elements 220. Chiller subplant 206 is shown to include a plurality of chillers 232 that remove heat from the cold water in cold water loop 216. Chiller subplant 206 is also shown to include several pumps 234 and 236 that circulate the cold water in cold water loop 216 and control the flow rate of the cold water through individual chillers 232.

Heat recovery chiller subplant 204 is shown to include a plurality of heat recovery heat exchangers 226 (e.g., refrigeration circuits) that can transfer heat from cold water loop 216 to hot water loop 214. Heat recovery chiller subplant 204 is also shown to include several pumps 228 and 230 that can circulate the hot water and/or cold water through heat recovery heat exchangers 226 and to control the flow rate of the water through individual heat recovery heat exchangers 226. Cooling tower subplant 208 is shown to include a plurality of cooling towers 238 that can remove heat from the condenser water in condenser water loop 218. Cooling tower subplant 208 is also shown to include several pumps 240 that can circulate the condenser water in condenser water loop 218 and to control the flow rate of the condenser water through individual cooling towers 238.

Hot TES subplant 210 is shown to include a hot TES tank 242 that can store the hot water for later use. Hot TES subplant 210 can also include one or more pumps or valves that can control the flow rate of the hot water into or out of hot TES tank 242. Cold TES subplant 212 is shown to include cold TES tanks 244 that can store the cold water for later use. Cold TES subplant 212 can also include one or more pumps or valves that can control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
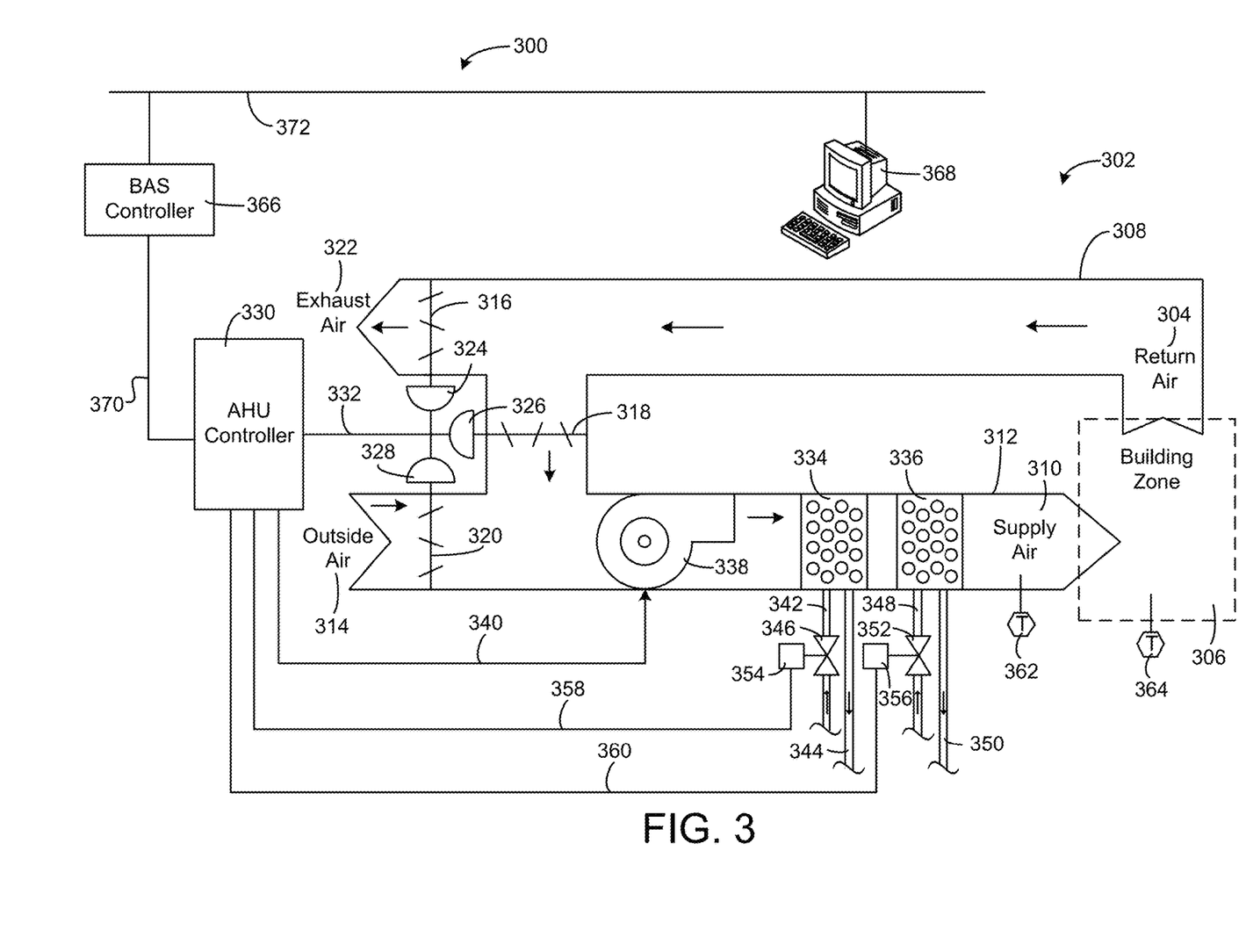
FIG. 3 is a schematic diagram of an airside system which may be used in conjunction with the building of FIG. 1, according to an exemplary embodiment.

Referring now to FIG. 3, a block diagram of an airside system 300 is depicted. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is depicted to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as depicted in FIG. 1) or otherwise positioned to receive both return air 304 and outside air 314. AHU 302 can be that can operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller that can use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be that can force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is depicted to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
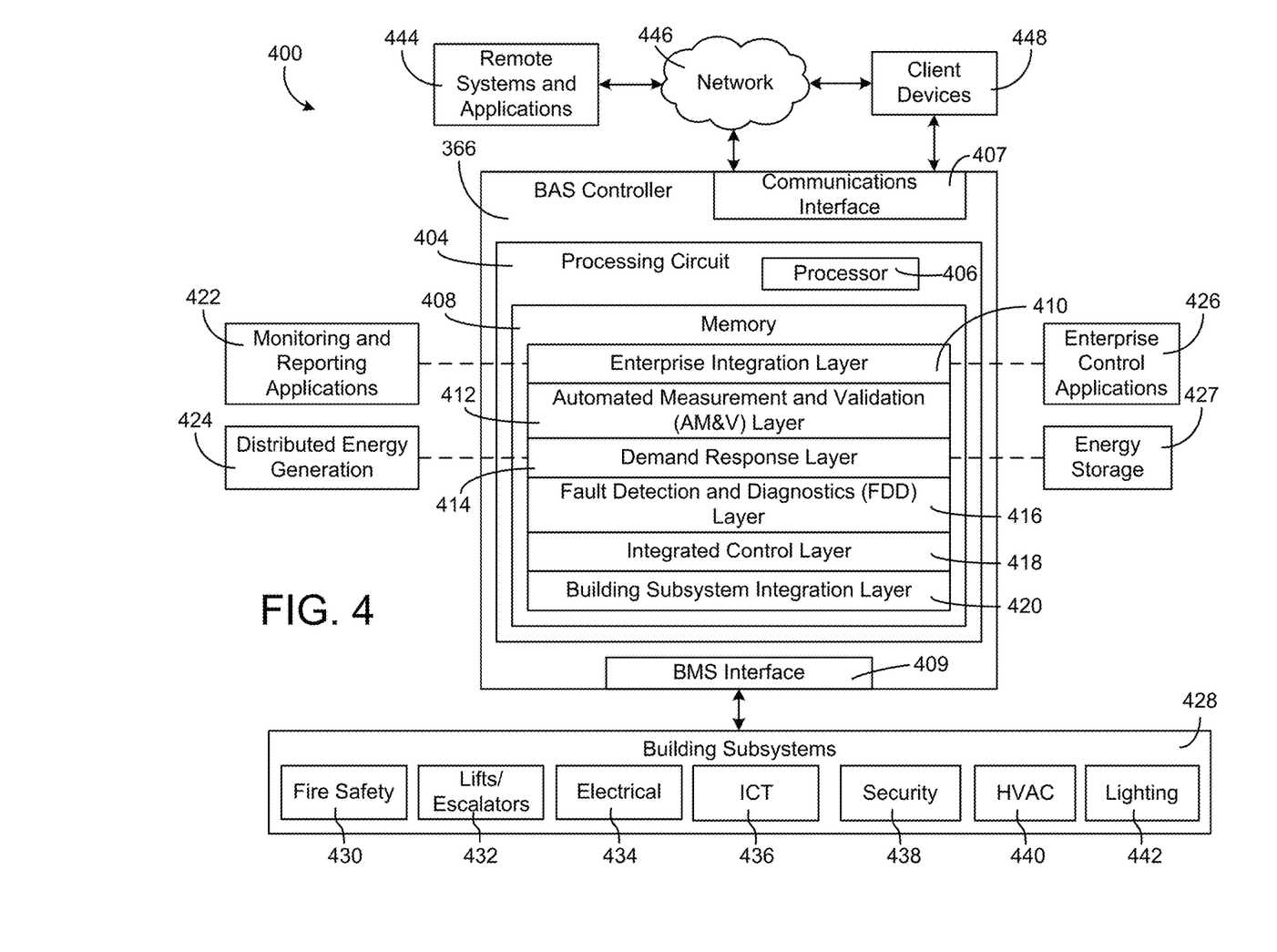
FIG. 4 is a block diagram of a building management system (BMS) which may be used to monitor and control the building of FIG. 1, according to an exemplary embodiment.

Referring now to FIG. 4, a block diagram of a building management system (BMS) 400 is depicted. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. Building subsystems 428 can include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices that can controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In some embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be serve clients or local applications with information and services to support a variety of enterprise-level applications. For example, enterprise control applications 426 can provide subsystem-spanning control to a graphical user interface (GUI) or to any number of enterprise-level business applications (e.g., accounting systems, user identification systems, etc.). Enterprise control applications 426 can provide configuration GUIs for configuring BMS controller 366. In some embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also manage communications between building subsystems 428. Building subsystem integration layer 420 translate communications (e.g., sensor data, input signals, output signals, etc.) across a plurality of multi-vendor/multi-protocol systems.

Demand response layer 414 can optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic to determine when to utilize stored energy. For example, demand response layer 414 can determine to begin using energy from energy storage 427 just prior to the beginning of a peak use hour.

In some embodiments, demand response layer 414 includes a control module that can actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can provide calculated inputs (e.g., aggregations) to these higher levels based on outputs from more than one building subsystem.

Automated measurement and validation (AM&V) layer 412 can verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm that can attempt to repair the fault or to work-around the fault.

FDD layer 416 can output a specific identification of the faulty component or cause of the fault (e.g., loose damper linkage) using detailed subsystem inputs available at building subsystem integration layer 420. In other exemplary embodiments, FDD layer 416 can provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
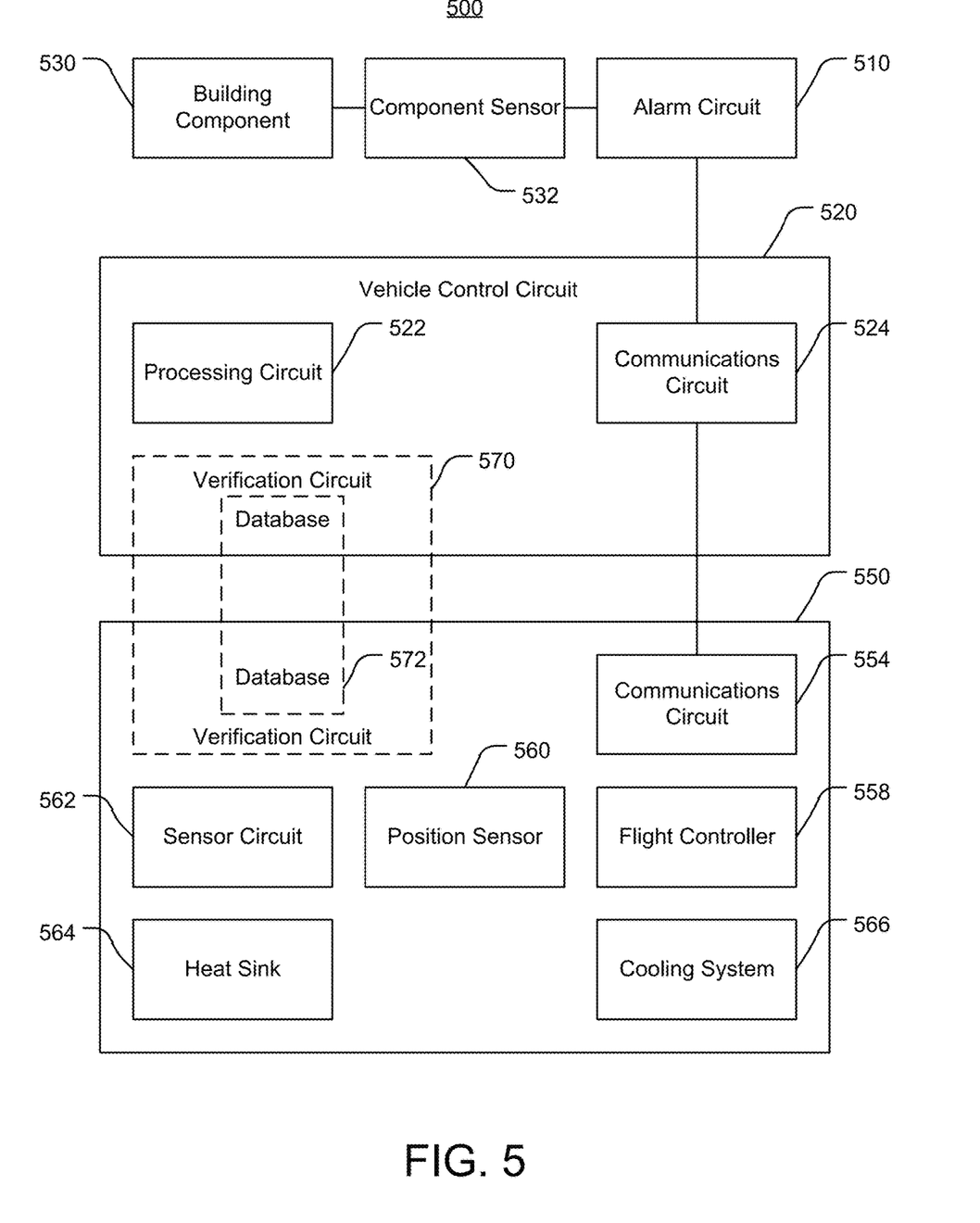
FIG. 5 is a block diagram of an equipment verification system, according to an exemplary embodiment.

Systems and Methods of Alarm Triggered Equipment Verification Using Drone Deployment of Sensors Referring now to FIG. 5, a block diagram of an equipment monitoring system 500 is depicted. The equipment monitoring system 500 can incorporates features of the HVAC system 100, waterside system 200, airside system 300, and BMS 400. The equipment monitoring system 500 includes an alarm circuit 510, a vehicle control circuit 520, and an unmanned vehicle 550. The vehicle control circuit 520 can receive an indication of an alarm condition of a building component 530 from the alarm circuit 510 and cause the unmanned vehicle 550 to move to a proximity of the building component 530 to verify the alarm condition. By remotely controlling the unmanned vehicle 550, the alarm circuit 510 and vehicle control circuit 520 can more quickly and accurately verify alarm conditions, including in situations where manual verification may not be possible due to environmental factors such as location, temperature, and presence of fire, gases, or chemicals.

The alarm circuit 510 detects a failure condition of the building component 530. The building component 530 can include any of various components described with respect to FIGS. 1-4, including but not limited to components of HVAC system 100, waterside system 200, airside system 300, or BMS 400. The alarm circuit 510 can be coupled to a component sensor 532 coupled to the building component 532. The component sensor 532 can output sensor information regarding the building component 530, based on which the alarm circuit 510 detects the failure condition, and can output an indication of the failure condition. For example, the alarm circuit 510 can output the indication of the failure condition to indicate a type of failure of the building component 530 (e.g., temperature is out of range, smoke/fire is present, improper operation). The alarm circuit 510 can incorporate features of FDD layer 416 described with reference to FIG. 4.

For example, the building component 530 can include a component of the HVAC system 100, such as chiller 102, and the component sensor 532 can include a temperature sensor that detects a temperature of the building component 530. The alarm circuit 510 can evaluate a temperature alarm condition based on the detected temperature and output the indication of the failure condition responsive to the detected temperature not satisfying the temperature alarm condition (e.g., the detected temperature is greater than a predetermined threshold temperature at which the building component 530 is expected to be overheating).

The vehicle control circuit 520 includes a processing circuit 522 and a communications circuit 524. The processing circuit 522 can incorporate features of the processing circuit 404 described with reference to FIG. 4. Communications circuit 524 can incorporate features of the communications interface 407 described with reference to FIG. 4.

The vehicle control circuit 520 receives the indication of the failure condition from the alarm circuit 510. The vehicle control circuit 520 transmit an equipment verification signal to the unmanned vehicle 550 to cause the unmanned vehicle 550 to execute a test of the building component 530 based on the equipment verification signal. The equipment verification signal can include an identifier of the building component 530, which the vehicle control circuit 520 can extract from the indication of the failure condition. As discussed further below, the vehicle control circuit 520 can generate the equipment verification signal to include a position of the building component 530, and can generate the equipment verification signal to include a test of the building component 530 to be executed by the unmanned vehicle.

The unmanned vehicle 550 can be an unmanned aerial vehicle, an unmanned land-based vehicle, a fixed wing vehicle, and/or a rotary wing vehicle. The unmanned vehicle 550 can be a drone. The unmanned vehicle 550 includes a communications circuit 554 and a flight controller 558. The communications circuit 554 can receive remote control signals. For example, the communications circuit 554 can receive the equipment verification signal from the vehicle control circuit 520. The communications circuit 554 can transmit data for receipt by remote entities, such as the alarm circuit 510 and/or the vehicle control circuit 520.

The flight controller 558 controls movement of the unmanned vehicle 550, such as by controlling flight actuators, engine controllers, or other components of the unmanned vehicle 550. The flight controller 558 can include an autopilot and/or an autothrottle. The unmanned vehicle 550 can include a position sensor 560, and the flight controller 558 can use position data received from the position sensor 560 to control movement of the unmanned vehicle 550. For example, the flight controller 558 can execute a flight navigation function to move to the position of the building component 530 based on information received from the position sensor 560.

In some embodiments, the unmanned vehicle 550 includes a sensor circuit 562. The sensor circuit 562 can be used to detect sensor data regarding the building component 530. For example, the sensor circuit 562 can detect at least one of temperature data, pressure data, sound data, or light data regarding the building component 530. The sensor circuit 562 can include at least one of a temperature sensor, an infrared sensor, a fire detector, a smoke detector, a light sensor, and a gas detector. The sensor circuit 562 can include an image capture device that can detect one or more images of the building component 530. The sensor circuit 562 can include an audio sensor that detects sound outputted by the building component 530. The sensor circuit 562 can transmit a sensor signal based on the detected sensor data to a remote entity, such as the alarm circuit 510 and/or the vehicle control circuit 520. The sensor circuit 562 can generate the sensor signal to include the detected sensor data (or a representation thereof). In some embodiments, the building component 530 includes a detectable identifier (e.g., a QR code, an RFID signal), that the sensor circuit 562 can detect to confirm that the building component 530 that the unmanned vehicle 550 is proximate to is the building component 530 corresponding to the indication of the failure condition.

As depicted in FIG. 5, the vehicle control circuit 520 and/or the unmanned vehicle 550 can include a verification circuit 570. The verification circuit 570 can verify the indication of the failure condition based on the sensor data received from the sensor circuit 562. The verification circuit 570 can analyze the sensor data to determine whether the failure condition is verified. The verification circuit 570 can output a verification signal indicating whether the failure condition is verified responsive to verifying the indication of the failure condition.

The verification circuit 570 can compare the sensor data to one or more thresholds corresponding to the failure condition, and verify the failure condition based on the comparison. For example, if the failure condition indicates that the building component 530 is in a failure alarm state if the temperature of the building component 530 is in a predetermined temperature range, the verification circuit 570 can compare a temperature of the sensor data to the predetermined temperature range to determine whether the failure condition is verified. If the failure condition indicates that the building component 530 is in a failure alarm state based on the presence of smoke, the verification circuit 570 can compare a smoke value (e.g., detected concentration of smoke particles) to a corresponding threshold indicative of the presence of smoke to determine whether the failure condition is verified.

In some embodiments, the verification circuit 570 verifies the failure condition based on sound detected by the sensor circuit 562. The verification circuit 570 can execute a frequency analysis of the detected sound to identify one or more frequencies of the detected sound. The verification circuit 570 can compare the identified one or more frequencies to at least one of (1) a frequency template indicative of the building component 530 being in the failure condition and (2) a frequency template indicative of the building component 530 not being in the failure condition, and verify the failure condition based on the comparison(s). For example, the verification circuit 570 may maintain a database indicating one or more predetermined frequencies at which the building component 530 is understood to be operating normally, and determine the building component 530 to not be in the failure condition responsive to the identified one or frequencies matching the one or more predetermined frequencies.

Functions executed by the verification circuit 570 may be distributed between the vehicle control circuit 520 and the unmanned vehicle 550 based on computational requirements. For example, if the test of the building component 530 is based on a temperature of the building component 530, the verification circuit 570 may perform a test of the temperature by comparing the temperature detected by the sensor circuit 562 to at least one of an upper threshold limit or a lower threshold limit, which may be a relatively low demand test for the processing hardware of the verification circuit 570 to perform. If the test of the building component 530 is based on a frequency analysis of audio received from the building component 530, the verification circuit 570 can be executed by the vehicle control circuit 520, which may have a relatively greater computational capacity as compared to the processing hardware of the unmanned vehicle 550. As such, the size, weight, and/or power requirements of unmanned vehicle 550 may be reduced without reducing the effectiveness of the system 500 in remotely verifying failure conditions of the building component 530.

In some embodiments, at least one of the vehicle control circuit 520 and the verification circuit 570 includes a database 572. The database 572 can assign each identifier of each building component 530 to a corresponding position of the building component 530. As such, the vehicle control circuit 520 can generate the equipment verification signal to include the corresponding position of the building component 530 based on which the indication of the failure condition was received, and/or the verification circuit 570 can retrieve the corresponding position from the database 572 to provide to the flight controller 558. In some embodiments, the database 572 maps predetermined routes to each building component 530, which the flight controller 558 can use to navigate movement of the unmanned vehicle 550.

The database 572 can map each indication of each failure condition to one or more tests to be performed on the building component 530. As such, the vehicle control circuit 520 can generate the equipment verification signal to include the test of the building component 530 to be executed by the unmanned vehicle 550 and/or the verification circuit 570 can retrieve the test to be executed from the database 572.

The unmanned vehicle 550 can improve upon existing systems by enabling verification of alarm conditions even in relatively harsh environmental conditions. For example, the unmanned vehicle 550 can include at least one of a heat sink 564 and a cooling system 566 to transport heat away from temperature-sensitive components of the unmanned vehicle 550, such as flight controller 558, sensor circuit 562, and/or verification circuit 570. In some embodiments, an operational temperature range of the unmanned vehicle 550 includes a temperature of at least 120 degrees Fahrenheit. The operational temperature range may indicate a range at which sensor output by the unmanned vehicle 550 has an error rate less than a threshold error rate (e.g., in operation, the error rate of the sensor circuit 562 is no more than ten percent more than a nominal error rate of the sensor circuit 562).

In response to receiving the verification signal, the alarm circuit 510 can modify the alarm, such as by deactivating the alarm if the verification signal indicates that the failure condition does not exist, for example, if the building component 530 is in a normal alarm state. In some embodiments, the flight controller 558 causes the unmanned vehicle to return to a base station responsive to at least one of (1) the sensor circuit 562 completing the test of the building component 530 and (2) the alarm circuit 510 modifying the alarm to be the normal alarm state.

Figure 6:
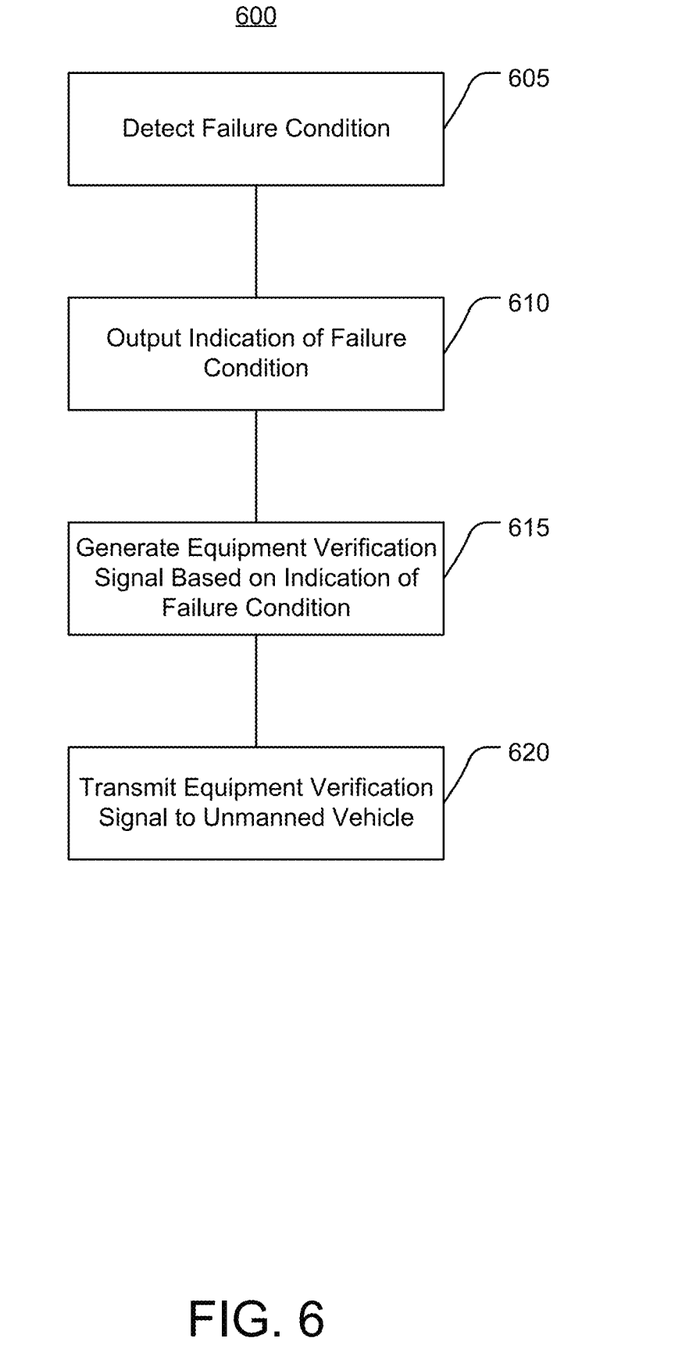
FIG. 6 is a flow diagram of a method of alarm triggered equipment verification using drone deployment of sensors, according to an exemplary embodiment.

Referring now to FIG. 6, a method 600 of alarm triggered equipment verification using drone deployment is depicted. The method 600 can be performed using the system 500 described with reference to FIG. 5.

At 605, a failure condition of a building component is detected by an alarm circuit. The alarm circuit can be coupled to an equipment sensor coupled to the building component, and can detect the failure condition based on sensor data detected by the equipment sensor. The alarm circuit can be remote from an unmanned vehicle.

At 610, the alarm circuit outputs an indication of the failure condition. The alarm circuit can output the indication to a vehicle control circuit remote from the unmanned vehicle. The alarm circuit can output a visual and/or audio alarm indicating the failure condition.

At 615, the vehicle control circuit generates an equipment verification signal based on the indication of the failure condition. The equipment verification signal can include an identifier of the building component. The equipment verification signal can include a position of the building component. The equipment verification signal can include a test of the building component to be executed.

At 620, the equipment verification signal is transmitted to the unmanned vehicle. The equipment verification signal can cause the unmanned vehicle to execute the test, such as to cause a sensor circuit of the unmanned vehicle to execute the test. For example, the sensor circuit can detect particular sensor data responsive to receiving the equipment verification signal.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An equipment monitoring system, comprising:
a control circuit comprising one or more processors to:
receive, from an alarm circuit, an indication of a condition of a building component;
generate, based on the indication, an equipment verification signal that includes an identifier of the building component and a test of the building component to be executed; and
transmit the equipment verification signal an unmanned vehicle to cause the unmanned vehicle to execute the test of the building component.

2. The equipment monitoring system of claim 1, comprising the control circuit to:
analyze sensor data of the unmanned vehicle; and
generate the equipment verification signal indicating that a failure condition is verified based on the sensor data.

3. The equipment monitoring system of claim 1, comprising:
the indication including an indication to test the building component; and
the condition corresponding to a temperature of the building component.

4. The equipment monitoring system of claim 1, comprising:
the control circuit to transmit the equipment verification signal to a flight controller of the unmanned vehicle via a wireless communications network.

5. The equipment monitoring system of claim 1, comprising:
the unmanned vehicle including at least one of a temperature sensor, an infrared sensor, a fire detector, a smoke detector, a light sensor, and a gas detector.

6. The equipment monitoring system of claim 1, comprising:
the unmanned vehicle to return to a base station responsive to at least one of (1) completion of the test of the building component or (2) the alarm circuit indicating the building component is in a normal state.

7. The equipment monitoring system of claim 1, wherein the alarm circuit is remote from the unmanned vehicle.

8. The equipment monitoring system of claim 1, wherein the control circuit is remote from the unmanned vehicle.

9. The equipment monitoring system of claim 1, wherein the equipment verification signal indicates a position of the building component.

10. The equipment monitoring system of claim 1, comprising:
the building component including a heater, a chiller, an air handling unit, a pump, a fan, or a thermal energy storage device.

11. The equipment monitoring system of claim 1, comprising:
the alarm circuit to determine the indication of the condition responsive to sensor information from a sensor coupled with the building component.

12. The equipment monitoring system of claim 1, comprising:
the control circuit to:
receive sensor data regarding the building component;
compare the sensor data to one or more thresholds associated with the condition; and
generate the equipment verification signal responsive to the comparison.

13. The equipment monitoring system of claim 1, comprising:
the control circuit to verify the condition based on a frequency analysis of sensor data received from the unmanned vehicle.

14. A method of alarm triggered equipment verification using drone deployment of sensors, comprising:
receiving, by a control circuit comprising one or more processors to, from an alarm circuit, an indication of a condition of a building component;
generating, based on the indication, an equipment verification signal that includes an identifier of the building component and a test of the building component to be executed; and
transmitting the equipment verification signal an unmanned vehicle to cause the unmanned vehicle to execute the test of the building component.

15. The method of claim 14, comprising:
detecting the condition of the building component, wherein the condition indicates testing of the building component.

16. The method of claim 14, comprising:
detecting, but a sensor circuit of the unmanned vehicle, sensor data regarding the building component.

17. The method of claim 14, wherein:
the building component comprises a heater, a chiller, an air handling unit, a pump, a fan, or a thermal energy storage device; and
the condition corresponds to a temperature of the building component.

18. The method of claim 14, comprising:
receiving sensor data regarding the building component;

comparing the sensor data to one or more thresholds associated with the condition; and generating the equipment verification signal responsive to the comparison.

19. The method of claim 14, comprising:

transmitting, by the one or more processors, the equipment verification signal to the unmanned vehicle via a wireless communications network.

20. The method of claim 14, comprising:

verifying, by the one or more processors, the condition based a frequency analysis of sensor data detected by the unmanned vehicle.

* * * * *